United States Patent
Young et al.

(10) Patent No.: US 11,316,793 B2
(45) Date of Patent: Apr. 26, 2022

(54) SYSTEM AND METHOD FOR SERVICE LEVEL AGREEMENT ASSURANCE IN TRANSPORT DOMAIN

(71) Applicant: Verizon Patent and Licensing Inc., Basking Ridge, NJ (US)

(72) Inventors: Kristen Sydney Young, Morris Plains, NJ (US); Kalyani Bogineni, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/878,014

(22) Filed: May 19, 2020

(65) Prior Publication Data

US 2021/0367892 A1 Nov. 25, 2021

(51) Int. Cl.
*H04L 12/851* (2013.01)
*H04L 47/2425* (2022.01)
*H04L 41/5019* (2022.01)
*H04L 47/20* (2022.01)
*H04L 47/625* (2022.01)

(52) U.S. Cl.
CPC ...... *H04L 47/2425* (2013.01); *H04L 41/5019* (2013.01); *H04L 47/20* (2013.01); *H04L 47/627* (2013.01)

(58) Field of Classification Search
None
See application file for complete search history.

(56) References Cited

U.S. PATENT DOCUMENTS

2005/0165925 A1\* 7/2005 Dan ................ H04L 67/325 709/224
2019/0373512 A1\* 12/2019 Fiaschi ............ H04L 41/5051

\* cited by examiner

*Primary Examiner* — Christine T Duong (57) ABSTRACT

A method, a system, and a non-transitory storage medium are described in which an adaptive packet scheduling and policy service is provided. The adaptive packet scheduling and policy service may provide adaptive packet scheduling in a transport domain of a network based on adaptive packet scheduling policies and network information. The adaptive packet scheduling and policy service may be applied to assured network services. The adaptive packet scheduling and policy service may also provide transport domain budgeting based on service level agreement violations associated with transport devices in the transport domain.

20 Claims, 8 Drawing Sheets

```
┌─────────────────────────────────────────────────────┐
│ COLLECT SLA VIOLATION OPPORTUNITIES RELATING TO     │
│ TRANSPORT DEVICES OF A TRANSPORT DOMAIN AND AN SLA- │
│           ASSURED NETWORK SERVICE                   │
│                      705                            │
└─────────────────────────────────────────────────────┘
                          │
                          ▼
┌─────────────────────────────────────────────────────┐
│ OBTAIN INFRASTRUCTURE INFORMATION RELATING TO A     │
│ NETWORK SLICE AND THE SLA-ASSURED NETWORK SERVICE   │
│                      710                            │
└─────────────────────────────────────────────────────┘
                          │
                          ▼
┌─────────────────────────────────────────────────────┐
│ CALCULATE A TRANSPORT DOMAIN BUDGET BASED ON THE SLA│
│   VIOLATION OPPORTUNITIES AND THE INFRASTRUCTURE    │
│                   INFORMATION                       │
│                      715                            │
└─────────────────────────────────────────────────────┘
                          │
                          ▼
┌─────────────────────────────────────────────────────┐
│ PROVISION THE TRANSPORT DOMAIN WITH THE TRANSPORT   │
│                 DOMAIN BUDGET                       │
│                      720                            │
└─────────────────────────────────────────────────────┘
```

Fig. 7

SYSTEM AND METHOD FOR SERVICE LEVEL AGREEMENT ASSURANCE IN TRANSPORT DOMAIN

BACKGROUND

Development and design of radio access networks (RANs), core networks, and application service networks, present certain challenges from a network-side perspective and an end device perspective. For example, depending on the configurations from both network-side and end device-side perspectives, such configurations may impact various performance metrics, such as accessibility, congestion, latency, throughput, etc. Accordingly, a need exists to overcome these challenges.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Packet handling by a transport device (e.g., a router, a switch, etc.) of a network (e.g., a Fifth Generation (5G) new radio (NR) network), may be insufficient to satisfy service level agreements (SLAs) of network services (e.g., 5G services, etc.). For example, with reference to transport scheduling, a transport device may have a limited number of egress queues, and packets may be classified and mapped to one of these queues. The queue buffer size of the transport device may be configured based on traffic burstiness and associated degree of tolerance. Also, there may be a single absolute priority queue suitable for small packets requiring expedited forwarding, and leaky bucket configuration for the remaining queues in which the bucket fill rate reflects queue priority (e.g., higher priority queues have a larger fill rate).

Given the above configurations, the queues of the transport device may be insufficient (e.g., in terms of granularity, etc.) to support the multitude of 5G services of a network. Additionally, per flow requirements are not visible to a scheduler, and may not be considered when packet scheduling. Also, policies used by the scheduler may be statically configured, such as queue size, bucket fill rate, and so forth.

According to exemplary embodiments, an adaptive packet scheduling and policy service is provided. According to exemplary embodiment, the adaptive packet scheduling and policy service may be implemented in an Open Network Automation Platform (ONAP) framework-based network. According to other exemplary embodiments, the adaptive packet scheduling and policy service may be implemented in a non-ONAP-based network.

According to an exemplary embodiment, the adaptive packet scheduling and policy service may include an admission control service. The admission control service may estimate an admitted load based on various criteria, such as the traffic/flow profile, the number of connections, current network loading and conditions of a network service (e.g., 5G service, a network slice service, or other application service) that is admitted (e.g., a network service that is assured for SLA, quality of service (QoS), the traffic/flow profile, or the like). The admission control service may provide the admitted load estimate for an admitted network service to an analytics service of the adaptive packet scheduling and policy service.

According to an exemplary embodiment, the analytics service may analyze network policies, such as network slice policies, the admitted load estimate, transport loading metrics, and other available network information, as described herein. The analytics service may provide inferred information to a policy service based on the analysis. For example, the inferred information may relate to the effectiveness of a current packet scheduling policy or other criterion of the policy, as described herein.

According to an exemplary embodiment, the policy service may manage the policies used and applied in the network. For example, the policy service may provide the analytics service with policies for analysis. Additionally, for example, the policy service may determine which policies to apply to the network based on the analysis of the analytics service. According to an exemplary embodiment, the policy service may include artificial intelligence (AI) for selecting policies to be configured in the network. According to an exemplary embodiment, the policies may be adaptive and include dynamic values, as described herein. According to an exemplary embodiment, the policy service may use infrastructure information relating to the transport domain (e.g., network slice, mid-haul, back-haul, front-haul, etc.). According to an exemplary embodiment, the policy service may also query a controller service to obtain information relating to SLA violation opportunities, as described herein. The policy service may provide selected policies and other information (e.g., budgeting, etc.) to the controller service, as described herein.

According to an exemplary embodiment, the controller service may configure policies with a transport service, subscribe or configure metric reporting from transport devices, provide SLA violation opportunity information to the policy service, aggregate telemetry information from the transport devices, and other functions, as described herein. According to an exemplary embodiment, the transport devices, which provide a transport service, may transport traffic based on a scheduling policy pertaining to an admitted network service.

In view of the foregoing, the adaptive packet scheduling and policy service may provide SLA assurance in the transport domain. Additionally, the adaptive packet scheduling and policy service may also provide SLA assurance without necessarily using costly resources (e.g., at the far edge of the network). In this regard, network resources may be optimally utilized without sacrificing SLA assurance. The adaptive packet scheduling and policy service may provide for packet scheduling based on individual traffic or flow requirements and provide a framework for adaptive scheduling policies.

Figure 1:
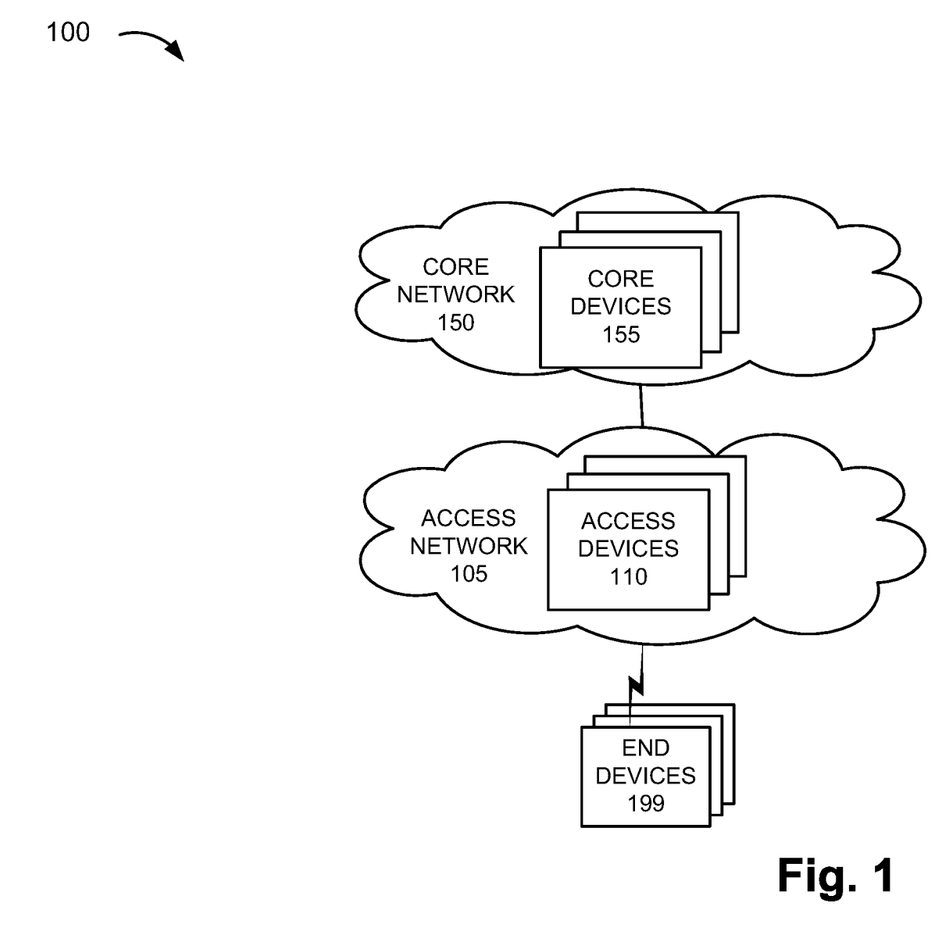
FIG. 1 is a diagram illustrating an exemplary environment in which an exemplary embodiment of an adaptive packet scheduling and policy service may be implemented.

FIG. 1 is a diagram illustrating an exemplary environment 100 in which an exemplary embodiment of the adaptive packet scheduling and policy service may be implemented. As illustrated, environment 100 includes an access network 105, and a core network 150. Access network 105 includes access devices 110, and core network 150 includes core devices 155. Access network 105 and/or core network 150 may be implemented as an ONAP network. Environment 100 further includes end devices 199.

The number, type, and arrangement of networks illustrated in environment 100 are exemplary. Additionally, or alternatively, other networks not illustrated in FIG. 1 may be included in environment 100, such as an xHaul network (e.g., a fronthaul network, a mid-haul network, a backhaul network, etc.), an application layer network, or another type of network.

The number, the type, and the arrangement of network devices in access network 105, and core network 150, as illustrated and described, are exemplary. The number of end devices 199 is exemplary. A network device, a network element, or a (physical/virtual) network function (referred to herein simply as a network device) may be implemented according to one or multiple network architectures (e.g., a client device, a server device, a peer device, a proxy device, a cloud device, a virtualized function, and/or another type of network architecture (e.g., Software Defined Networking (SDN), virtual, logical, network slicing, etc.)). Additionally, a network device may be implemented according to various computing architectures, such as centralized, distributed, cloud (e.g., elastic, public, private, etc.), edge, fog, and/or another type of computing architecture.

Environment 100 includes communication links between the networks, between network devices, and between end device 199 and network devices. Environment 100 may be implemented to include wired, optical, and/or wireless communication links among the network devices and the networks illustrated. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number and the arrangement of communication links illustrated in environment 100 are exemplary.

Environment 100 may include various planes of communication including, for example, a control plane, a user plane, a service plane, and/or a network management plane. Environment 100 may include other types of planes of communication. A message communicated in support of the adaptive packet scheduling and policy service may use at least one of these planes of communication. According to various exemplary implementations, the interface of the network device may be a service-based interface, a reference point-based interface, an Open Radio Access Network (O-RAN) interface, or some other type of interface.

Access network 105 may include one or multiple networks of one or multiple types and technologies. For example, access network 105 may be implemented to include a next generation RAN (e.g., a Fifth Generation (5G)-access network (5G-AN) or a 5G-RAN (referred to herein as simply a 5G-RAN)), another type of future generation RAN, a Fourth Generation (4G) RAN (e.g., an Evolved UMTS Terrestrial Radio Access Network (E-UTRAN) of a Long Term Evolution (LTE) network), a 4.5G RAN (e.g., an E-UTRAN of an LTE-Advanced (LTE-A) network), an RAN of an LTE-A Pro network, and/or another type of RAN (e.g., a legacy Third Generation (3G) RAN, etc.). Access network 105 may further include other types of wireless networks, such as a Wi-Fi network, a Worldwide Interoperability for Microwave Access (WiMAX) network, a local area network (LAN), a Bluetooth network, a personal area network (PAN), a Citizens Broadband Radio System (CBRS) network, or another type of wireless network (e.g., a legacy Third Generation (3G) RAN, O-RAN Reference Architecture, a virtualized RAN (vRAN), a self-organizing network (SON), etc.). Access network 105 may include a wired network, an optical network, or another type of network that may provide communication with core network 150, for example.

According to an exemplary embodiment, access network 105 may include an xHaul network, such as a fronthaul network, a mid-haul network, and/or a backhaul network. Access network 105 may provide the adaptive packet scheduling and policy service.

Access network 105 may include different and multiple functional splitting, such as options 1, 2, 3, 4, 5, 6, 7, or 8 that relate to combinations of access network 105 and core network 120 including an EPC network and/or a NG core (NGC) network, or the splitting of the various layers (e.g., physical layer, Media Access Control (MAC) layer, Radio Link Control (RLC) layer, and Packet Data Convergence Protocol (PDCP) layer), plane splitting (e.g., user plane, control plane, etc.), centralized unit (CU) and distributed unit (DU), interface splitting (e.g., F1-U, F1-C, E1, Xn-C, Xn-U, X2-C, Common Public Radio Interface (CPRI), etc.) as well as other types of services, such as dual connectivity (DC) or higher (e.g., a secondary cell group (SCG) split bearer service, a MCG split bearer, an SCG bearer service, E-UTRA-NR (EN-DC), NR-E-UTRA-DC (NE-DC), NG RAN E-UTRA-NR DC (NGEN-DC), or another type of DC (e.g., multi-radio access technology (RAT) (MR-DC), single-RAT (SR-DC), etc.), carrier aggregation (CA) (e.g., intra-band, inter-band, contiguous, non-contiguous, etc.), network slicing, coordinated multipoint (CoMP), various duplex schemes (e.g., frequency division duplex (FDD), time division duplex (TDD), half-duplex FDD (H-FDD), etc.), and/or another type of connectivity service (e.g., NSA) (e.g., non-standalone NR, non-standalone E-UTRA, etc.), SA (e.g., standalone NR, standalone E-UTRA, etc.), etc.).

According to various exemplary embodiments, access network 105 may be implemented to include various architectures of wireless service, such as, for example, macrocell, microcell, femtocell, picocell, metrocell, NR cell, LTE cell, non-cell, or another type of architecture. Additionally, according to various exemplary embodiments, access network 105 may be implemented according to various wireless technologies (e.g., RATs, etc.), wireless standards, wireless frequencies/bands/carriers (e.g., centimeter (cm) wave, millimeter (mm) wave, below 6 GHz, above 6 GHz, licensed radio spectrum, unlicensed radio spectrum, NR low band, NR mid-band, NR high band, etc.), and/or other attributes of radio communication.

Depending on the implementation, access network 105 may include one or multiple types of network devices, such as access devices 110. For example, access devices 110 may include a next generation Node B (gNB), an evolved Node B (eNB), an evolved Long Term Evolution (eLTE) eNB, a radio network controller (RNC), a remote radio head (RRH), a baseband unit (BBU), a centralized unit (CU), a distributed unit (DU), a small cell node (e.g., a picocell device, a femtocell device, a microcell device, a home eNB, etc.), open network devices (e.g., O-RAN Centralized Unit (O-CU), O-RAN Distributed Unit (O-DU), O-RAN next generation Node B (O-gNB), O-RAN evolved Node B (O-eNB, etc.), a future generation wireless access device, another type of wireless node (e.g., a WiMax device, a hotspot device, etc.) that provides a wireless access service, or other another type of network device that provides a transport service (e.g., routing and forwarding), such as a router, a switch, or another type of layer 3 (e.g., network layer of the Open Systems Interconnection (OSI) model) network device. According to some exemplary implementations, access devices 110 may include a combined functionality of multiple RATs (e.g., 4G and 5G functionality).

According to an exemplary embodiment, a portion of access devices 110 may include logic that provides the adaptive packet scheduling and policy service, as described herein. For example, the portion of access devices 110 may provide the transport service, as described herein, (e.g., routing and forwarding), such as a router, a switch, or another type of layer 3 (e.g., network layer of the Open Systems Interconnection (OSI) model) network device. Also, the portion of access devices 110 may include logic that provides other services of the adaptive packet scheduling and policy service, as described herein.

Core network 150 may include one or multiple networks of one or multiple types and technologies. According to an exemplary embodiment, core network 150 includes a complementary network of access network 105. For example, core network 150 may be implemented to include a 5GC network (also known as NGC network) (or other type of a future generation network), an EPC of an LTE network, an LTE-Advanced (LTE-A) network, and/or an LTE-A Pro network. Core network 150 may include a legacy core network.

Depending on the implementation, core network 150 may include various types of network devices, such as core devices 155. For example, core devices 155 may include a mobility management entity (MME), a packet gateway (PGW), an enhanced packet data gateway (ePDG), a serving gateway (SGW), a home agent (HA), a General Packet Radio Service (GPRS) support node (GGSN), a home subscriber server (HSS), an authentication, authorization, and accounting (AAA) server, a policy charging and rules function (PCRF), a charging system (CS), a user plane function (UPF), a Non-3GPP Interworking Function (N3IWF), an access and mobility management function (AMF), a session management function (SMF), a unified data management (UDM) device, a unified data repository (UDR) device, an authentication server function (AUSF), a network slice selection function (NSSF), a network repository function (NRF), a policy control function (PCF), a network data analytics function (NWDAF), a network exposure function (NEF), a lifecycle management (LCM) device, and/or an application function (AF). According to other exemplary implementations, core devices 155 may include additional, different, and/or fewer network devices than those described. For example, core devices 155 may include a non-standard and/or a proprietary network device, or another type of network device that may be well-known but not particularly mentioned herein. Core devices 155 may also include a network device that provides a multi-RAT functionality (e.g., 4G and 5G), such as an SMF with PGW control plane functionality (e.g., SMF+PGW–C), a UPF with PGW user plane functionality (e.g., UPF+PGW–U), a service capability exposure function (SCEF) with a NEF (SCEF+NEF), and/or other combined nodes (e.g., an HSS with a UDM and/or UDR, an MME with an AMF, etc.). Access network 105 and/or core network 150 may include a public network, a private network, and/or an ad hoc network.

According to an exemplary embodiment, a portion of core devices 155 may include logic that provides the adaptive packet scheduling and policy service, as described herein. For example, the portion of core devices 155 may provide the transport service, as described herein, Also, the portion of core devices 155 may include logic that provides other services of the adaptive packet scheduling and policy service, as described herein.

End device 199 includes a device that has computational and wireless communicative capabilities. Depending on the implementation, end device 199 may be a mobile device, a portable device, a stationary device, a device operated by a user (e.g., UE, etc.), or a device not operated by a user (e.g., an Internet of Things (IoT) device, etc.). For example, end device 199 may be implemented as a smartphone, a mobile phone, a personal digital assistant, a tablet, a netbook, a phablet, a wearable device (e.g., a watch, glasses, etc.), a computer, a device in a vehicle, a gaming device, a music device, an IoT device, or other type of wireless device. End device 199 may be configured to execute various types of software (e.g., applications, programs, etc.). The number and the types of software may vary among end devices 199.

Figure 2:
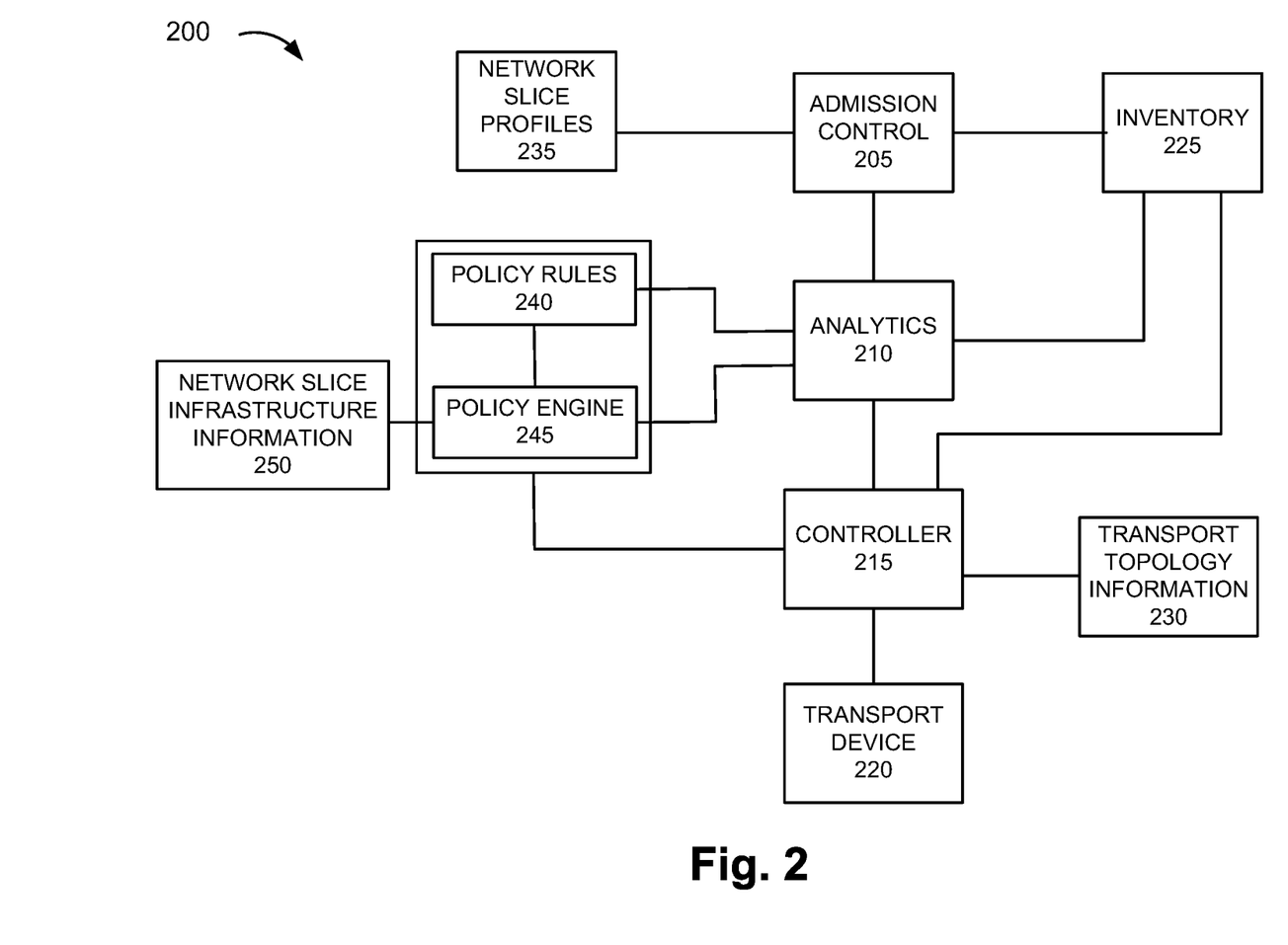
FIG. 2 is a diagram illustrating an exemplary framework in which an exemplary embodiment of the adaptive packet scheduling and policy service may be implemented.

FIG. 2 is a diagram illustrating an exemplary framework 200 in which an exemplary embodiment of the adaptive packet scheduling and policy service may be implemented in environment 100. As illustrated, framework 200 may include an admission control device 205, an analytics device 210, a controller device 215, a transport device 220, an inventory device 225, a transport topology information device 230, a network slice profiles device 235, a policy rules device 240, a policy engine device 245, and a network slice infrastructure information device 250. The type and the arrangement of network devices in framework 200, as illustrated and described, are exemplary. For the sake of description and illustration, the number of network devices are also exemplary.

Admission control device 205 includes a network device that provides the admission control service. For example, admission control device 205 may assure SLA for traffic within a service profile, but traffic exceeding the service profile may not be assured. Admission control device 205 may derive an estimated loading value. Admission control device 205 may calculate the estimated loading value based on, for example, a traffic profile and/or a flow profile, and the number of connections for a service. For example, the traffic profile or the flow profile may indicate traffic or flow information, such as a maximum burst size, a burst duration, an average flow rate, and/or other types of characteristics of the traffic or flow (e.g., Quality of Service (QoS) parameters, QoS Class Identifiers (QCIs), etc.).

Admission control device 205 may calculate an admitted load estimate for admitted services. For example, admission control device 205 may calculate the admitted load estimate based on information from inventory device 225, as described herein.

Analytics device 210 may include a network device that provides the analytics service. Analytics device 210 may provide information to policy engine 245 based on network slice policies from policy rules device 240, the admitted load estimate from admission control device 205, transport loading metrics from controller 215, and possibly other information from sources outside of the transport domain that may relate to current and/or future network states or conditions. For example, enrichment information may relate to usage and/or loading patterns of the admitted network service, mobility patterns for end devices 199, and/or other types of historical or contextual information that may be relevant to or impact the transport domain.

According to an exemplary embodiment, the analytics service may generate inferred (or interpretative) information based on various types of information analyzed, such as the actual current network loading, the admitted load estimate, network slice policies, and the enrichment information. The inferred information may relate to a network policy and/or rule. Depending on the policy or the rule, the inferred information may provide insight to enforce and/or make decisions about the policy or the rule. Also, depending on the policy or the rule, the inferred information may relate to the entire transport domain or a component thereof, such as an xHaul network, a network slice, an admitted network service, for example, as well as other criteria, such as geographic location, time period, a type of transport device 220, a performance metric, and/or another policy-related factor. According to exemplary embodiments, the inferred information may include predictive or anticipated information and non-predictive information. For example, the predictive information may relate to an anticipated condition associated with the policy, and the non-predictive information may relate to the condition associated with the policy having been satisfied or not. For example, the inferred information may relate to predictive or non-predictive information associated with a threshold crossing, packet discarding, congestion, SLA violation, and/or other network-related information or events of relevance to packet scheduling and adaptive policies, as described herein.

Controller device 215 may include a network device that provides the controller service. Controller device 215 may install, configure, and/or provide adaptive scheduling policies to transport device 220. Controller device 215 may configure thresholds and threshold-based scheduling information at transport device 220.

Controller device 215 may subscribe to or configure transport metrics reporting with transport device 220 and report the transport metrics and policy enforcement status to analytics device 210. The transport metrics may include, for example, packet drops and threshold crossing event information associated with SLA. Metrics reporting may be done, for example, via peer-to-peer interface or a message bus infrastructure.

Controller device 215 may obtain transport topology information from transport topology information device 230 and use this information to identify the transport devices 220 under its control and the associated transport topology/xHaul. Policy engine device 245 may communicate to controller device 215 which xHaul(s) to be assured. Controller device 215 may provide policy engine 245 information indicating the degree of SLA violation opportunities associated with transport devices 220 under its control. For example, the information may include the number of transport devices 220 where packets may experience congestion, or a weighted representation of the number of transport devices 220. Controller device 215 may also aggregate telemetry from transport devices 220 under its control. Controller devices 215 may be deployed centrally for multiple transport devices 220 or distributed for each transport device 220 in the transport domain (e.g., xHaul network, inter-DC, intra-DC, etc.).

Transport device 220 may include a network device that provides the transport service. For example, transport device 220 may be implemented as a router, a switch (e.g., a programmable white box switch, Open white box switch, etc.), or similar type of network device. According to an exemplary embodiment of the transport service, when a transmission opportunity arises (e.g., when a packet is to be selected for transmission), transport device 220 may select the packet with the highest priority for transmission, and the corresponding queue may be de-prioritized by an amount determined by a scheduling policy. The amount of de-prioritization may depend on a lower bound indicated by the scheduling policy. In some cases, this may be zero. For a threshold crossing event, the priority of affected traffic or flow may be elevated by an amount specified in the scheduling policy for that service.

Inventory device 225 may include a network device that obtains measured loading information from controller device 215 and generates a current load for a transport domain under the control of the controller device 215 based on inventory information. Inventory device 225 may store and manage the inventory information indicating total amounts of network resources within the transport domain. The total amount of network resources may be dynamic (e.g., due to failures, additions, re-deployment, etc.). The current load may correspond to a utilization of network resources relative to the total amount of network resources.

Transport topology information device 230 may include a network device that stores and manages information relating to the topology of the transport domains. For example, the information may include topology information relating to xHaul networks, which include transport devices 220. The information may also include end-to-end path information.

Network slice profiles device 235 may include a network device that stores and manages information relating to network slices. For example, the information may include traffic or flow profiles supported by the network slices, and the number of connections for the admitted network services.

Policy rules device 240 may include a network device that provides the policy service. For example, policy rules device 240 may store and manage policy rules of the network. The policy rules may relate to user plane functions and may manage application and service data flow detection, gating control, QoS control, traffic steering, routing, network slicing, charging, internetworking, and/or other types of network management operations. Although the policy rules may be initially configured, the policy rules may not be static. For example, policy engine device 245 may update the policy rules based on the adaptive packet scheduling and policy service, as described herein.

Policy engine device 245 may include a network device that provides the policy service. Policy engine device 245 may determine the policies to install or configure at controller device 215 based on information from analytics device 210 and other information, as described herein. According to an exemplary embodiment, policy engine device 245 may determine the policies to install or configure based on AI (e.g., machine learning (ML) logic).

Scheduling policies may include default parameters and values. For example, a scheduling policy may include a default priority level, a minimum priority level, and a maximum priority level. The scheduling policy may also include a priority level delta increase amount for a threshold crossing, and a priority level delta decrease amount after a pre-emptive schedule for a threshold crossing. Other types of default parameters and values may be implemented. As illustrated in Table 1 below, exemplary priority delta increase values and priority delta decrease values (illustrated as variables, such as x, p, c, y, q, etc.) may be correlated to a threshold value (e.g., threshold−1, threshold−2, etc.).

TABLE 1

|  | Priority Delta Increase | Priority Delta Decrease |
|---|---|---|
| <Threshold-1 | +x | −y |
| Threshold - 1 | +p | −q |
| Threshold - 2 | +c | −f |
| Threshold - n | +m | −n |

Policy engine device 245 may modify a parameter value of a scheduling policy based on the inferred information from analytics device 210, and optionally other information (e.g., network slice infrastructure information, SLA violation opportunities, etc.) and/or other factors (e.g., budgeting decisions, etc.), as described herein. For example, the inferred information may indicate that an actual loading is larger than the estimated admitted loading. Policy engine device 245 may adapt a priority level value (e.g., increase priority) of flows for the admitted network service. According to another example, the inferred information may indicate a predicted threshold crossing beyond a threshold watermark value. Policy engine device 245 may adapt a priority level value (e.g., increase priority) of flows for an admitted network service, and/or change a threshold watermark value, which may be relative to an SLA target. According to various exemplary implementations, a threshold crossing event may represent an actual degree of SLA violation or a degree of SLA violation possibility (but not yet an SLA violation). According to an exemplary embodiment, a parameter value or a range of parameter values may be modified to a value not available under the current packet scheduling policy. According to an exemplary embodiment, the adapted packet scheduling policy may include additional, fewer, and/or different parameter and parameter value relative to the current packet scheduling policy. Policy engine device 245 may update policy rules device 240 with the updated adaptive scheduling policy.

Policy engine device 245 may consult network slice infrastructure information device 250 to determine the characteristics of the transport deployed for the admitted network service. Policy engine device 245 may query each controller 215 to obtain its respective SLA violation opportunities for an admitted network service. For example, referring to FIG. 3A, policy engine 245 may query controller device 215 for SLA violation opportunities for the admitted network service. Policy rules device 240 may provide the policy to policy engine device 245. As further illustrated in FIG. 3A, controller device 215 may provide a response to policy engine device 245 which may include the SLA violation opportunities associated with transport devices 220-1 and 220-2.

Figure 3A:
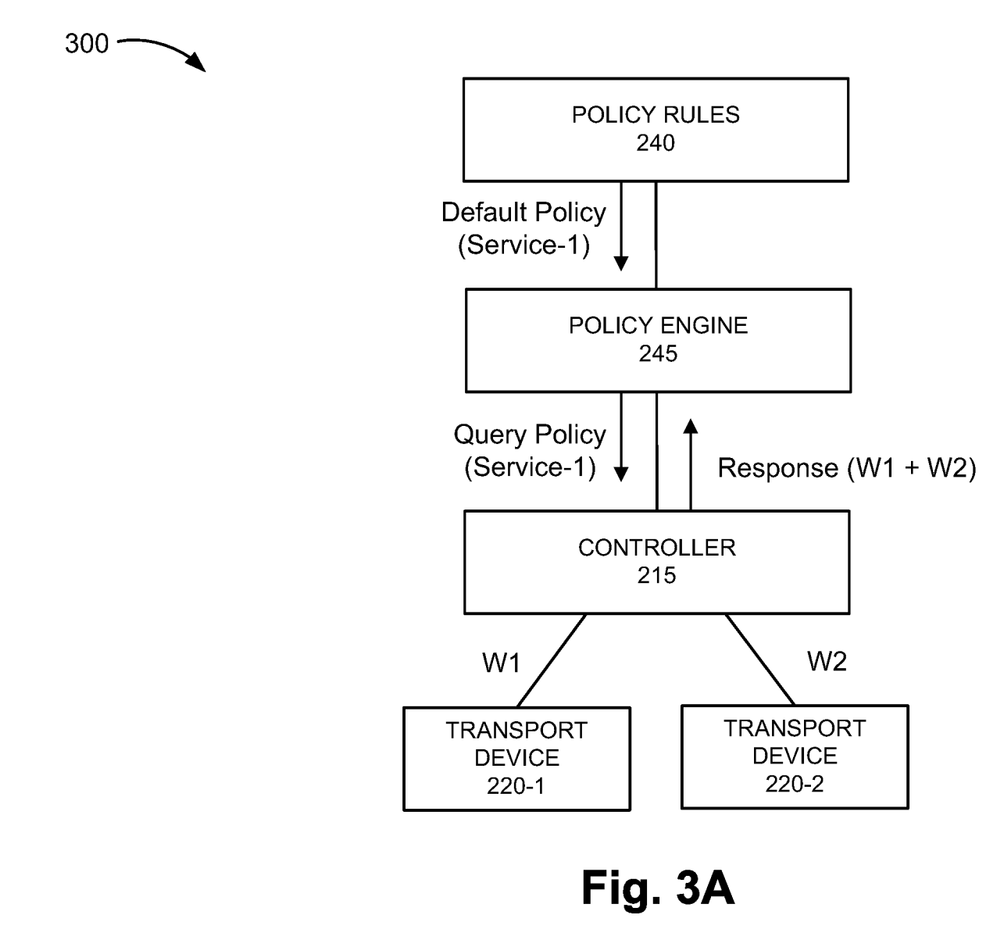
FIG. 3A is a diagram illustrating an exemplary process of an exemplary embodiment of the adaptive packet scheduling and policy service.

An SLA violation opportunity may represent a distinct place where packets can experience SLA violation, and a weight factor reflecting how likely the SLA violation may occur. For example, the likelihood of the SLA violation may be based on various factors, such as circuit size, current traffic loading, and current scheduling policies.

SLA violation opportunities per controller device 215 with a total of i occasions for packets to experience a violation, may be calculated according to the exemplary expression:

$$\text{Sum}(W_i) \qquad (1),$$

in which Wi is the weight associated with an i-th occasion where packets may experience the violation. The weight W may be, for example, proportional to the likelihood of packets belonging to the admitted network service to experience the violation based on various factors, such as traffic conditions from other network services, default scheduling policies, and other configurable criteria.

Figure 3B:
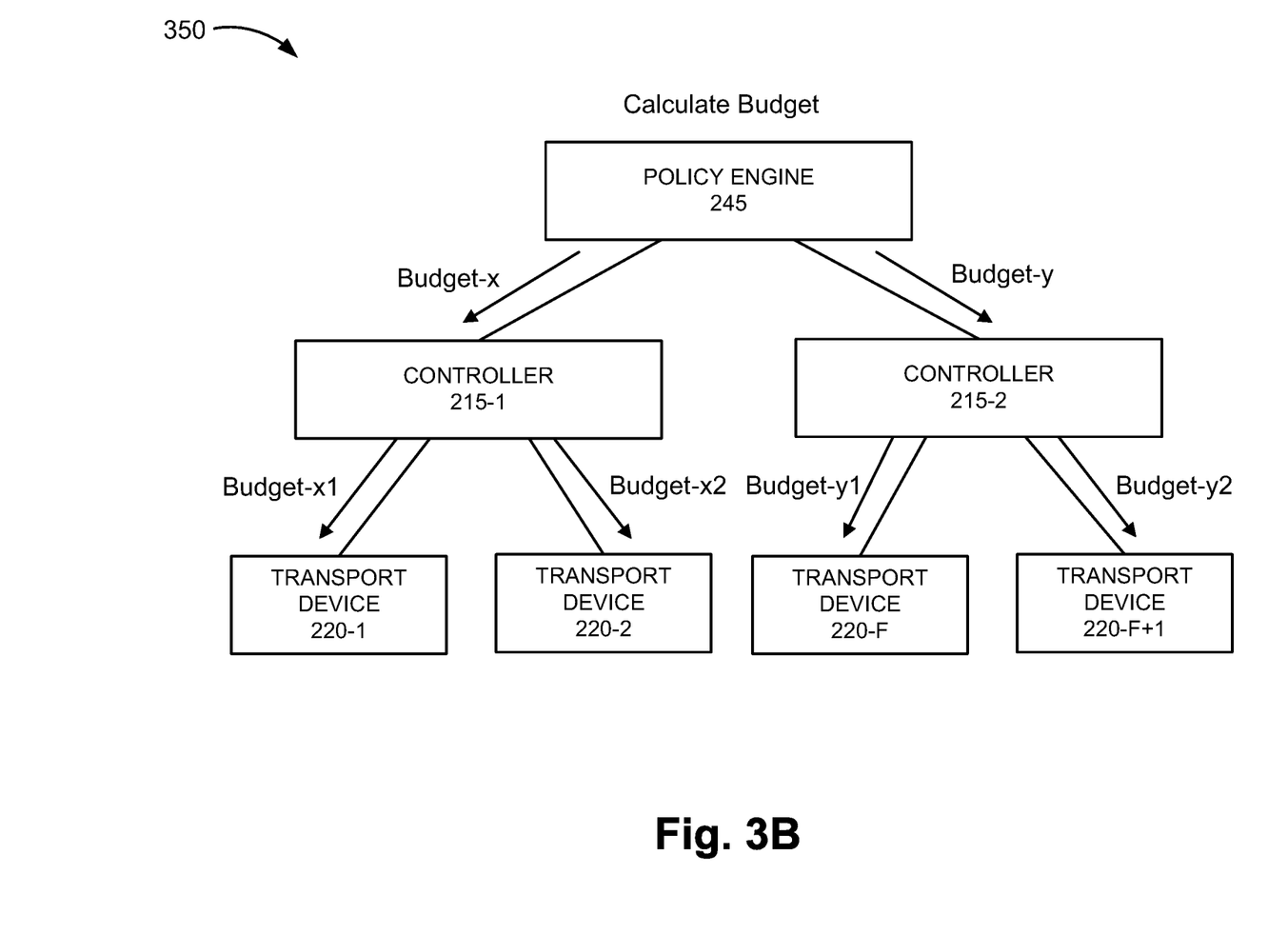
FIG. 3B is a diagram illustrating another exemplary process of an exemplary embodiment of the adaptive packet scheduling and policy service.

Policy engine device 245 may determine how to budget the transport domain across controllers 215 based on the degree of SLA violation opportunities under each controller device 215. For example, policy engine device 245 may divide the total transport domain based on SLA violation opportunities from controller devices 215. By way of further example, each controller device 215 may be allocated a percentage of the total budget that is proportional to its SLA violation opportunities. Policy engine device 245 may provide the budget to each controller device 215. Controller device 215 may further allocate the budget across the transport devices 220 under its control. FIG. 3B is a diagram illustrating an exemplary process 350 in which a budget for the transport domain may be calculated and distributed among network devices of relevance.

Policy engine device 245 may also determine how to budget end-to-end among different domains apart from the transport domain, such as a RAN domain, a core domain, an application layer domain, and/or another type of network domain, based on the SLA violation opportunities or other configurable criteria.

Network slice infrastructure information device 250 may include a network device that stores and manages network infrastructure information pertaining to network slices. The network infrastructure information may include the topology relating to controller devices 215 and transport devices 220 of network slices and associated services.

Figure 4:
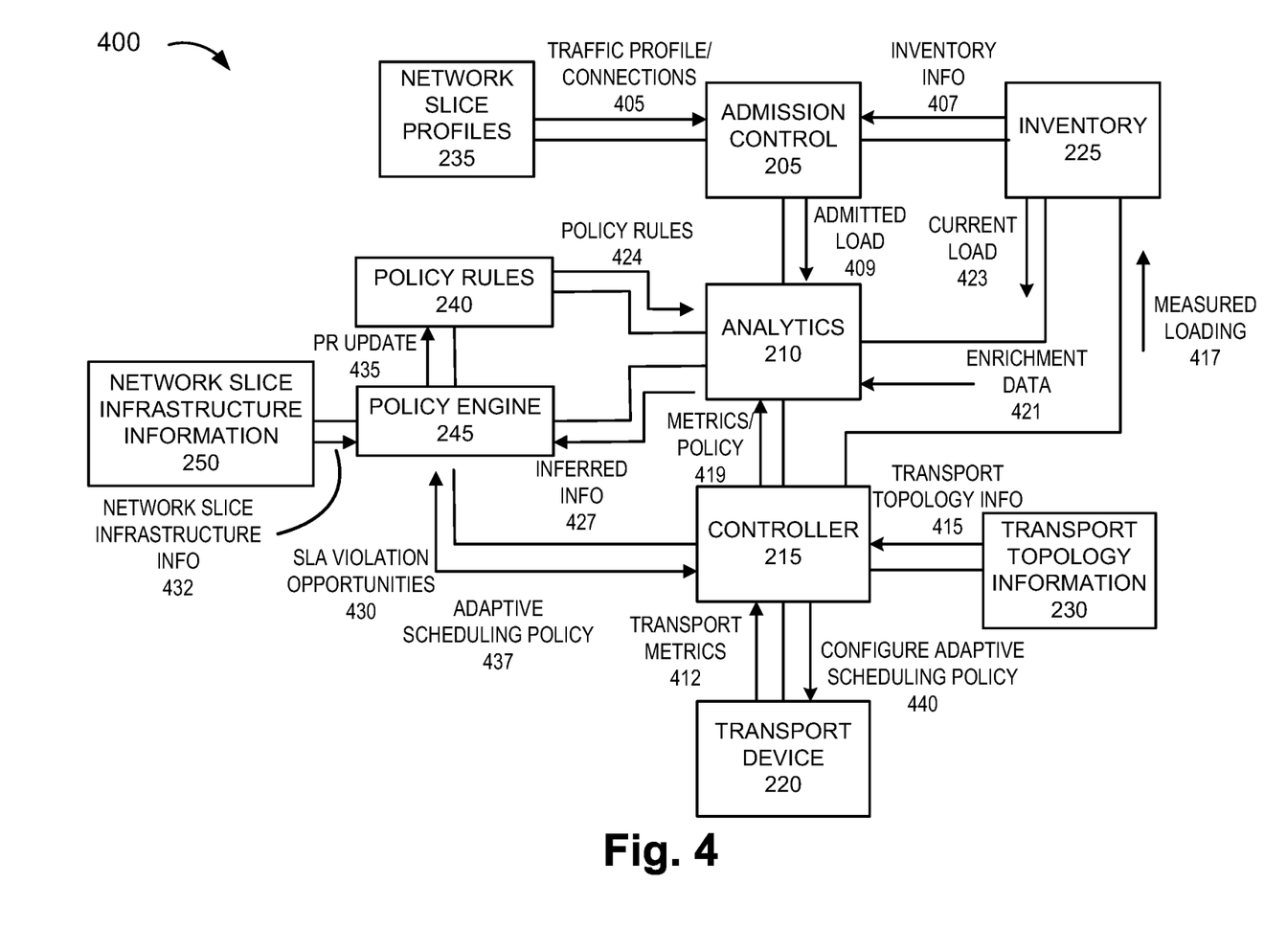
FIG. 4 is a diagram illustrating still another exemplary process of an exemplary embodiment of the adaptive packet scheduling and policy service.

FIG. 4 is a diagram illustrating an exemplary process 400 of an exemplary embodiment of the adaptive packet scheduling and policy service. As illustrated, admission control device 205 may receive traffic profile and number of connections information 405 from network slice profiles device 235, and inventory information 407 from inventory device 225. Admission control device 205 may generate an admitted load 409 based on the received information.

As further illustrated, controller device 215 may obtain transport metrics information 412 from transport device 220, and transport topology information 415 from transport topology information device 230. Controller device 215 may generate and provide measuring loading 417 associated with transport devices 220 under its control to inventory device 225.

Controller device 215 may generate and provide transport metrics and policy enforcement status information 417 to analytics device 210 based on the transport metrics information 412. Analytics device 210 may obtain enrichment data 421 from various network devices (e.g., access devices 110, core devices 110, application layer devices, or other types of devices that may reside outside of the transport domain). Inventory device 225 may generate and provide current load information 423 to analytics device 210 based on measured loading 417 and inventory information. Additionally, analytics device 210 may obtain policy rules 424 (e.g., network slice policies, non-network slice policies) from policy rules device 240. Based on the obtained information, analytics device 210 may generate inferred information 427 and provide the inferred information 427 to policy engine device 245.

Policy engine device 245 may obtain SLA violation opportunity information 430 from controller device 215, and network slice infrastructure information 432 from network slice infrastructure information device 250. Based on the obtain information, policy engine 245 may generate and update policy rules device 240 with policy rules update information 435. Also, policy engine device 245 may generate and provide an adaptive scheduling policy 437 to controller device 215. Controller device 215 may configure or install the adaptive scheduling policy 440 with transport device 220.

Figure 5:
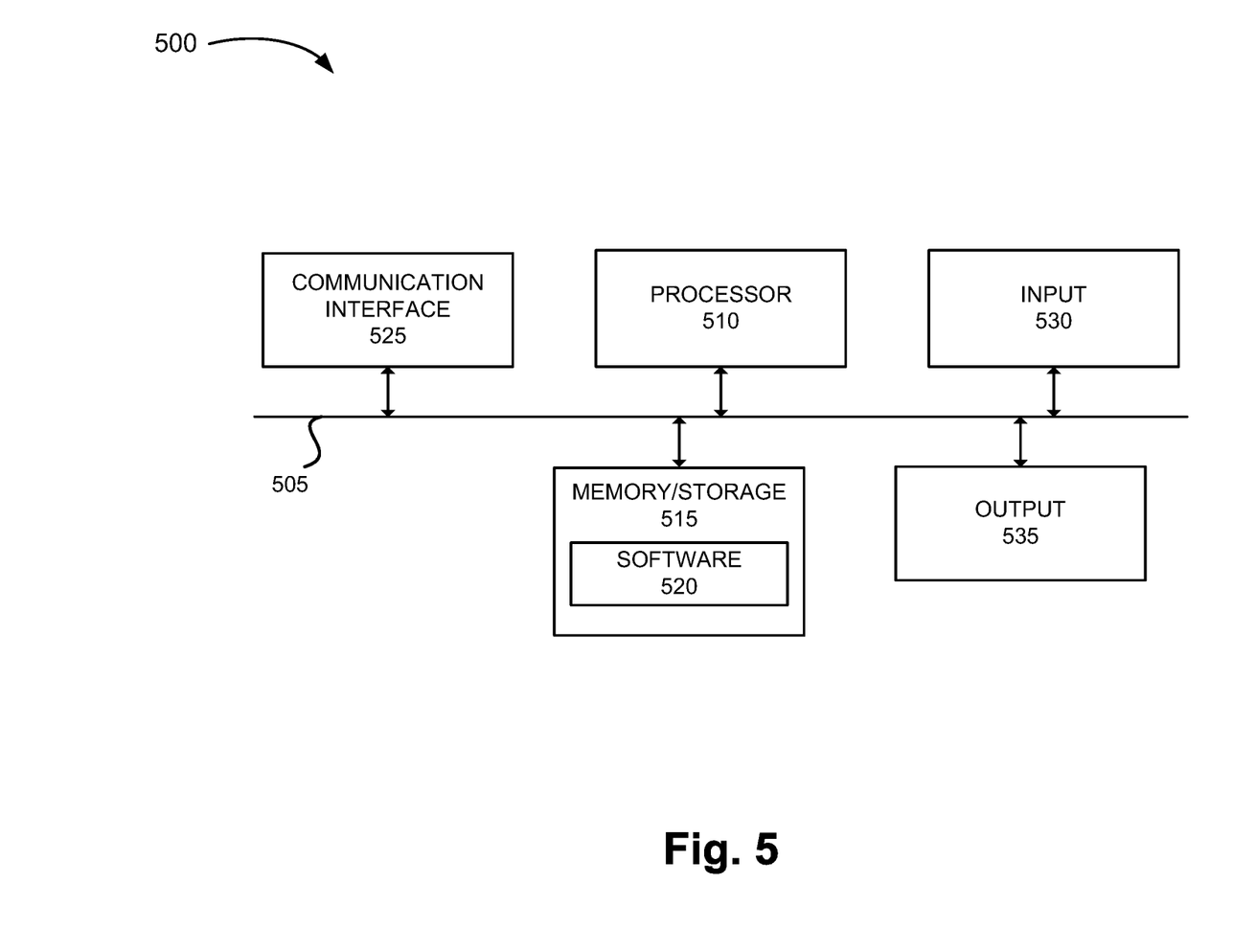
FIG. 5 is a diagram illustrating exemplary components of a device that may correspond to one or more of the devices illustrated and described herein.

FIG. 5 is a diagram illustrating exemplary components of a device 500 that may be included in one or more of the devices described herein. For example, device 500 may correspond to access devices 110, core devices 155, network devices of framework 200, and other types of network devices or logic, as described herein. As illustrated in FIG. 5, device 500 includes a bus 505, a processor 510, a memory/storage 515 that stores software 520, a communication interface 525, an input 530, and an output 535. According to other embodiments, device 500 may include fewer components, additional components, different components, and/or a different arrangement of components than those illustrated in FIG. 5 and described herein.

Bus 505 includes a path that permits communication among the components of device 500. For example, bus 505 may include a system bus, an address bus, a data bus, and/or a control bus. Bus 505 may also include bus drivers, bus arbiters, bus interfaces, clocks, and so forth.

Processor 510 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 510 may be implemented as hardware (e.g., a microprocessor, etc.), a combination of hardware and software (e.g., a SoC, an ASIC, etc.), may include one or multiple memories (e.g., cache, etc.), etc.

Processor 510 may control the overall operation, or a portion of operation(s) performed by device 500. Processor 510 may perform one or multiple operations based on an operating system and/or various applications or computer programs (e.g., software 520). Processor 510 may access instructions from memory/storage 515, from other components of device 500, and/or from a source external to device 500 (e.g., a network, another device, etc.). Processor 510 may perform an operation and/or a process based on various techniques including, for example, multithreading, parallel processing, pipelining, interleaving, etc.

Memory/storage 515 includes one or multiple memories and/or one or multiple other types of storage mediums. For example, memory/storage 515 may include one or multiple types of memories, such as, a random access memory (RAM), a dynamic random access memory (DRAM), a static random access memory (SRAM), a cache, a read only memory (ROM), a programmable read only memory (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 515 may include a hard disk (e.g., a magnetic disk, an optical disk, a magneto-optic disk, a solid-state disk, etc.), a Micro-Electromechanical System (MEMS)-based storage medium, and/or a nanotechnology-based storage medium. Memory/storage 515 may include drives for reading from and writing to the storage medium.

Memory/storage 515 may be external to and/or removable from device 500, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 515 may store data, software, and/or instructions related to the operation of device 500.

Software 520 includes an application or a program that provides a function and/or a process. As an example, software 520 may include an application that, when executed by processor 510, provides a function of the adaptive packet scheduling and policy service, as described herein. Software 520 may also include firmware, middleware, microcode, hardware description language (HDL), and/or other form of instruction. Software 520 may also be virtualized. Software 520 may further include an operating system (OS) (e.g., Windows, Linux, Android, proprietary, etc.).

Communication interface 525 permits device 500 to communicate with other devices, networks, systems, and/or the like. Communication interface 525 includes one or multiple wireless interfaces and/or wired interfaces. For example, communication interface 525 may include one or multiple transmitters and receivers, or transceivers. Communication interface 525 may operate according to a protocol stack and a communication standard. Communication interface 525 may include an antenna. Communication interface 525 may include various processing logic or circuitry (e.g., multiplexing/de-multiplexing, filtering, amplifying, converting, error correction, application programming interface (API), etc.). Communication interface 525 may be implemented as a point-to-point interface, a service-based interface, etc., as previously described.

Input 530 permits an input into device 500. For example, input 530 may include a keyboard, a mouse, a display, a touchscreen, a touchless screen, a button, a switch, an input port, speech recognition logic, and/or some other type of visual, auditory, tactile, etc., input component. Output 535 permits an output from device 500. For example, output 535 may include a speaker, a display, a touchscreen, a touchless screen, a light, an output port, and/or some other type of visual, auditory, tactile, etc., output component.

As previously described, a network device may be implemented according to various computing architectures and according to various network architectures (e.g., a virtualized function, etc.). Device 500 may be implemented in the same manner. For example, device 500 may be instantiated, created, deleted, or some other operational state during its life-cycle (e.g., refreshed, paused, suspended, rebooting, or another type of state or status), using well-known virtualization technologies (e.g., hypervisor, container engine, virtual container, virtual machine, etc.) in a network.

Device 500 may perform a process and/or a function, as described herein, in response to processor 510 executing software 520 stored by memory/storage 515. By way of example, instructions may be read into memory/storage 515 from another memory/storage 515 (not shown) or read from another device (not shown) via communication interface 525. The instructions stored by memory/storage 515 cause processor 510 to perform a process and/or a function, as described herein. Alternatively, for example, according to other implementations, device 500 performs a process and/or a function as described herein based on the execution of hardware (processor 510, etc.).

Figure 6:
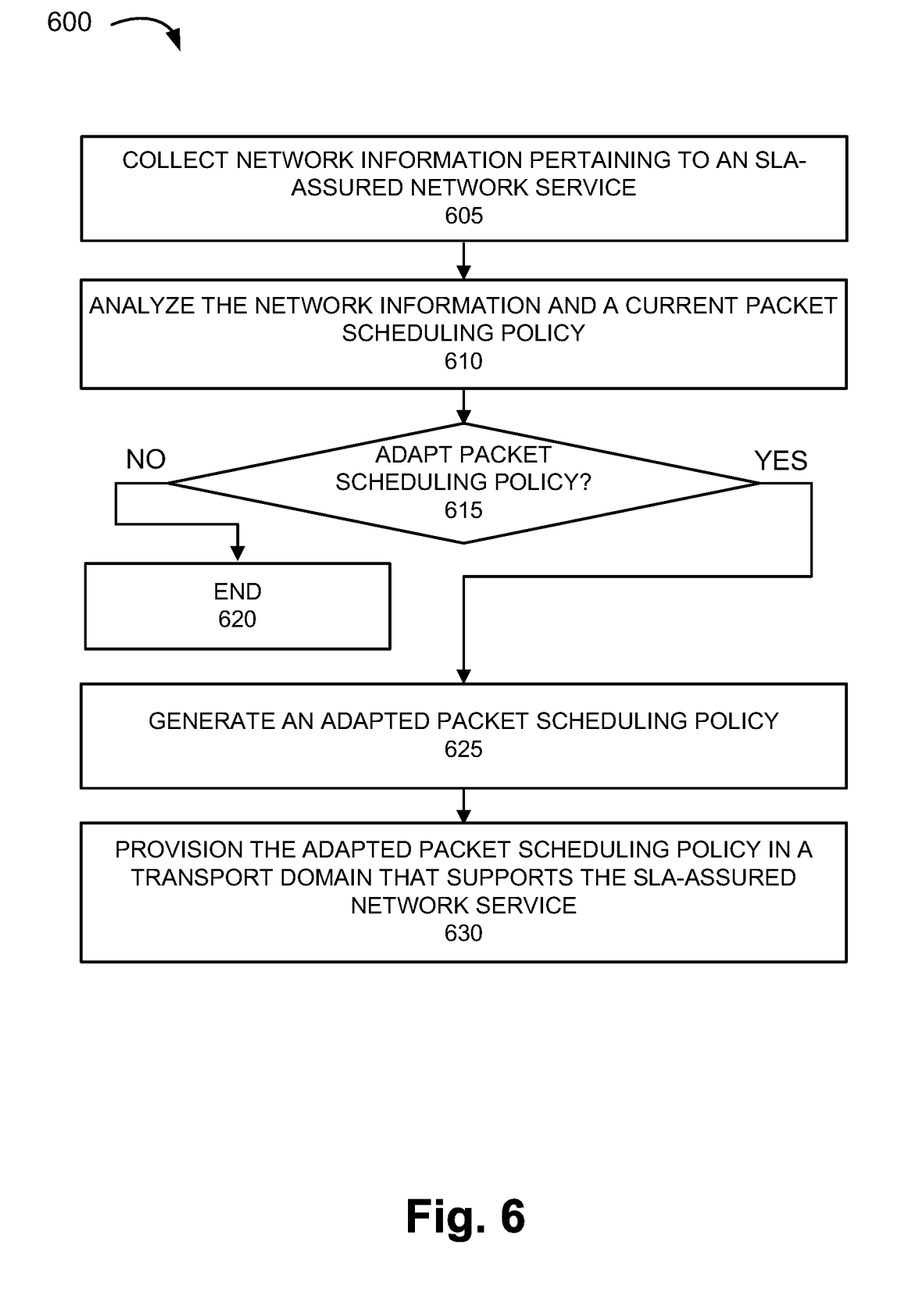
FIG. 6 is a flow diagram illustrating an exemplary process of an exemplary embodiment of the adaptive packet scheduling and policy service.

FIG. 6 is a flow diagram illustrating another exemplary process 600 of an exemplary embodiment of the adaptive packet scheduling and policy service. According to an exemplary embodiment, a network device of a 5G network may perform steps of process 600. According to other exemplary embodiments, the network device may be of a non-5G network. According to an exemplary implementation, processor 510 executes software 520 to perform a step illustrated in FIG. 6 and described herein. Alternatively, a step illustrated in FIG. 6 and described herein, may be performed by execution of only hardware.

Referring to FIG. 6, in block 605, the network device may collect network information pertaining to an SLA-assured network service. For example, the network information may include a current load, an admitted load, enrichment information, network slice policies, traffic profile information, and/or inferred information.

In block 610, the network device may analyze the network information and a current packet scheduling policy. For example, the network device may identify underlying criteria, which may or may not be predictive criteria (e.g., an SLA target, a flow priority level, threshold) associated with the current packet scheduling policy, that relates to satisfying SLA requirements of the SLA-assured network service in the transport domain. In block 615, the network device may determine whether the current packet scheduling policy is to be adapted or not based on the analysis.

When the network device determines that the current packet scheduling policy is not to be adapted (block 615—NO), process 600 may end. For example, the current packet scheduling policy may remain provisioned in a transport domain of a network that supports the SLA-assured network service.

When the network device determines that the current packet scheduling policy is to be adapted (block 615—YES), the network device may generate an adapted packet scheduling policy (block 625). For example, the network device may modify one or multiple parameter values of the current packet scheduling policy provisioned in the transport domain of the network that supports the SLA-assured network service.

In block 630, the network device may provision the adapted packet scheduling policy in the transport domain that supports the SLA-assured network service. For example, the network device may provision transport devices via controller devices, as described herein.

FIG. 6 illustrates an exemplary process 600 of the adaptive packet scheduling and policy service, however, according to other embodiments, process 600 may include additional operations, fewer operations, and/or different operations than those illustrated in FIG. 6 and described herein.

Figure 7:
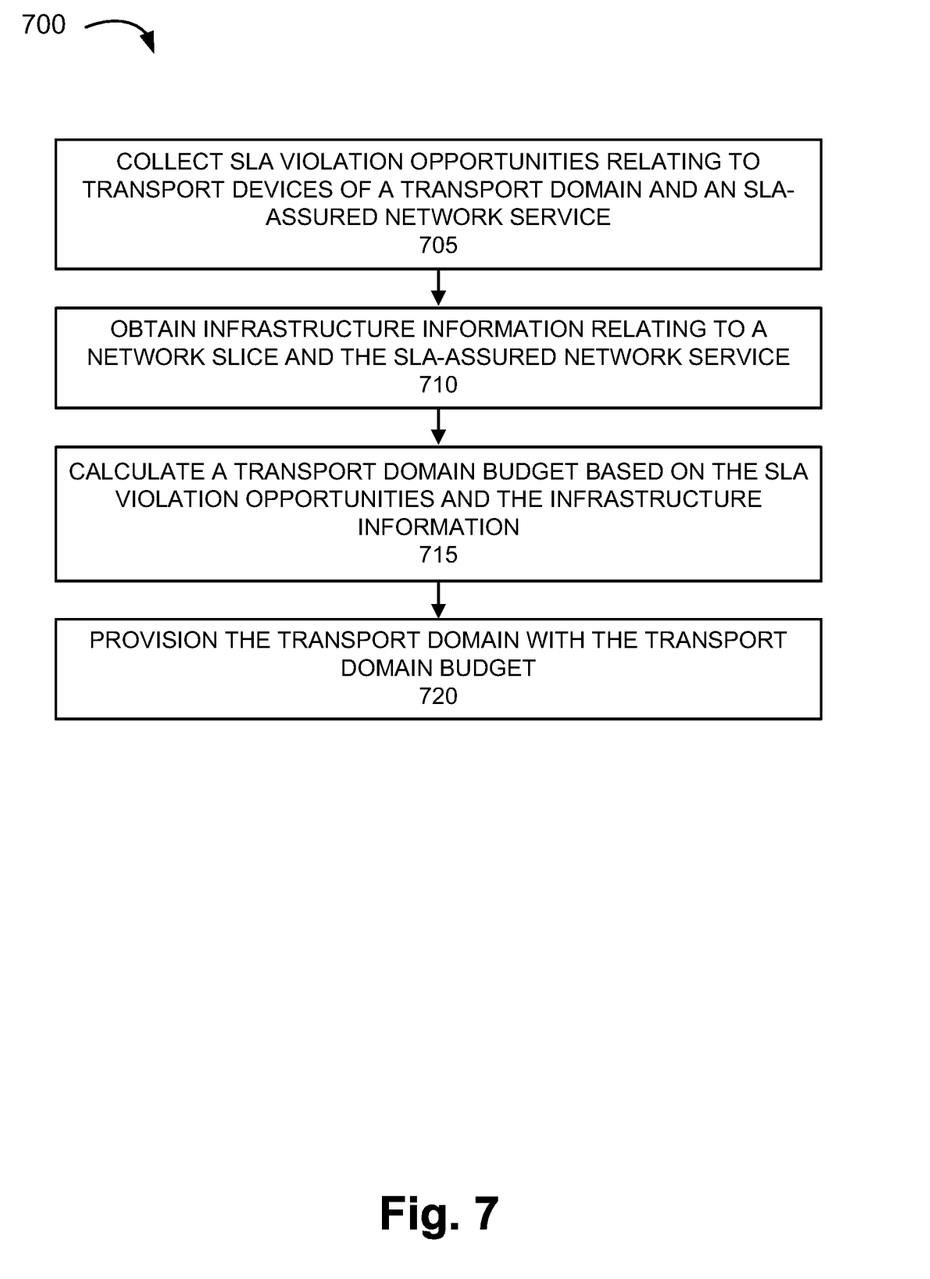
FIG. 7 is a flow diagram illustrating another exemplary process of an exemplary embodiment of the adaptive packet scheduling and policy service.

FIG. 7 is a flow diagram illustrating another exemplary process 700 of an exemplary embodiment of the adaptive packet scheduling and policy service. According to an exemplary embodiment, a network device of a 5G network may perform steps of process 700. According to other exemplary embodiments, the network device may be of a non-5G network. According to an exemplary implementation, processor 510 executes software 520 to perform a step illustrated in FIG. 7 and described herein. Alternatively, a step illustrated in FIG. 7 and described herein, may be performed by execution of only hardware.

In block 705, the network device may collect SLA violation opportunities relating to transport devices of a transport domain and an SLA-assured network service. For example, an SLA violation opportunity may indicate an instance where a packet may experience an SLA violation relative to the SLA-assured network service. The SLA violation opportunity may indicate a weighted value (e.g., likelihood) of the packet belonging to the SLA-assured network service.

In block 710, the network device may obtain infrastructure information relating to a network slice and the SLA-assured network service. For example, the infrastructure information may include the topology relating to controller devices and transport devices of network slices and associated services.

In block 715, the network device may calculate a transport domain budget based on the SLA violation opportunities and the infrastructure information. For example, the network device may calculate the total SLA violation opportunities and divide a total transport domain budget based on the total SLA violation opportunities and the infrastructure information.

In block 720, the network device may provision the transport domain with the transport domain budget. For example, the network device may provision transport devices via controller devices, as described herein. By way of further example, each controller device may be allocated a percentage of the total transport domain budget proportional to the SLA violation opportunities associated with the controller device.

FIG. 7 illustrates an exemplary process 700 of the adaptive packet scheduling and policy service, however, according to other embodiments, process 700 may include additional operations, fewer operations, and/or different operations than those illustrated in FIG. 7 and described herein. For example, the network device may budget additional or different domains of network, which may or may not include the transport domain. For example, the network device may budget an end-to-end budget associated with an SLA-assured network service and/or budgets associated with domains other than the transport domain (e.g., a RAN domain, a core domain, an application service/layer domain).

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described regarding the processes illustrated in FIGS. 6 and 7, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 510, etc.), or a combination of hardware and software (e.g., software 520).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 510) of a device. A non-transitory storage medium includes one or more of the storage mediums described in relation to memory/storage 515. The non-transitory computer-readable storage medium may be implemented in a centralized, distributed, or logical division that may include a single physical memory device or multiple physical memory devices spread across one or multiple network devices.

To the extent the aforementioned embodiments collect, store or employ personal information of individuals, such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

What is claimed is:

1. A method comprising:
   collecting, by a network device, network information pertaining to a service level agreement (SLA)-assured network service;
   analyzing, by the network device, the network information and a current packet scheduling policy;
   determining, by the network device based on the analyzing, whether the current packet scheduling policy is to be adapted;
   generating, by the network device based on determining that the current packet scheduling policy is to be adapted, an adapted packet scheduling policy, wherein one or more parameter values of the current packet scheduling policy are modified including at least one of queue size or fill rate; and
   provisioning, by the network device, the adapted packet scheduling policy in a transport domain of a network that supports the SLA-assured network service.

2. The method of claim 1, further comprising:
   generating, by the network device, an estimated admitted load based on a traffic profile and number of connections for the SLA-assured network service; and
   generating, by the network device, a current load of network resources in the transport domain, wherein the network information includes the estimated admitted load and the current load.

3. The method of claim 2, further comprising:
   generating, by the network device, inferred information based on the estimated admitted load and the current load, wherein the network information includes the inferred information.

4. The method of claim 1, wherein the determining comprises:
   determining, by the network device based on the analyzing, that at least one of an actual SLA violation occurred or an anticipated SLA violation is to occur.

5. The method of claim 1, further comprising:
   updating, by the network device to a policy device, the current packet scheduling policy with the adapted packet scheduling policy.

6. The method of claim 1, wherein the network information includes SLA violation opportunities associated with transport devices of the transport domain and the SLA-assured network service, and the method further comprising:
   calculating, by the network device, a total transport domain budget based on the SLA violation opportunities; and
   provisioning, by the network device each controller device of the transport domain, a portion of the total transport domain budget.

7. The method of claim 6, wherein the portion of the total transport domain budget is proportional to a contribution to the SLA violation opportunities by a portion of the transport devices associated with each controller device.

8. The method of claim 1, wherein the one or more parameter values include a threshold crossing value pertaining to scheduling transmission of packets in a queue of a transport device in the transport domain.

9. A network device comprising:
a processor, wherein the processor is configured to:
collect network information pertaining to a service level agreement (SLA)-assured network service;
analyze the network information and a current packet scheduling policy;
determine, based on the analysis, whether the current packet scheduling policy is to be adapted;
generate, based on a determination that the current packet scheduling policy is to be adapted, an adapted packet scheduling policy, wherein one or more parameter values of the current packet scheduling policy are modified including at least one of queue size or fill rate; and
provision the adapted packet scheduling policy in a transport domain of a network that supports the SLA-assured network service.

10. The network device of claim 9, wherein the processor is further configured to:
generate an estimated admitted load based on a traffic profile and number of connections for the SLA-assured network service; and
generate a current load of network resources in the transport domain, wherein the network information includes the estimated admitted load and the current load.

11. The network device of claim 10, wherein the processor is further configured to:
generate inferred information based on the estimated admitted load and the current load, wherein the network information includes the inferred information.

12. The network device of claim 9, wherein when determining, the processor is further configured to:
determine, based on the analysis, that at least one of an actual SLA violation occurred or an anticipated SLA violation is to occur.

13. The network device of claim 12, wherein the processor is further configured to:
update the current packet scheduling policy with the adapted packet scheduling policy on a policy device.

14. The network device of claim 9, wherein the network information includes SLA violation opportunities associated with transport devices of the transport domain and the SLA-assured network service, and the processor is further configured to:
calculate a total transport domain budget based on the SLA violation opportunities; and
provision each controller device of the transport domain, a portion of the total transport domain budget.

15. The network device of claim 14, wherein the portion of the total transport domain budget is proportional to a contribution to the SLA violation opportunities by a portion of the transport devices associated with each controller device.

16. The network device of claim 9, wherein the one or more parameter values include a threshold crossing value pertaining to scheduling transmission of packets in a queue of a transport device in the transport domain.

17. A non-transitory computer-readable storage medium storing instructions executable by a processor of a network device, which when executed cause the network device to:
collect network information pertaining to a service level agreement (SLA)-assured network service;
analyze the network information and a current packet scheduling policy;
determine, based on the analysis, whether the current packet scheduling policy is to be adapted;
generate, based on a determination that the current packet scheduling policy is to be adapted, an adapted packet scheduling policy, wherein one or more parameter values of the current packet scheduling policy are modified including at least one of queue size or fill rate; and
provision the adapted packet scheduling policy in a transport domain of a network that supports the SLA-assured network service.

18. The non-transitory computer-readable storage medium of claim 17, wherein the network information includes SLA violation opportunities associated with transport devices of the transport domain and the SLA-assured network service, and wherein the instructions further include instructions, which when executed cause the network device further to:
calculate a total transport domain budget based on the SLA violation opportunities; and
provision each controller device of the transport domain, a portion of the total transport domain budget.

19. The non-transitory computer-readable storage medium of claim 18, wherein the portion of the total transport domain budget is proportional to a contribution to the SLA violation opportunities by a portion of the transport devices associated with each controller device.

20. The non-transitory computer-readable storage medium of claim 17, wherein the one or more parameter values include a threshold crossing value pertaining to scheduling transmission of packets in a queue of a transport device in the transport domain.

* * * * *